March 7, 1967
C. B. CURRIE
3,307,785
ON-OFF AND MODULATING CONDITION CONTROL VALVE
Filed July 22, 1965
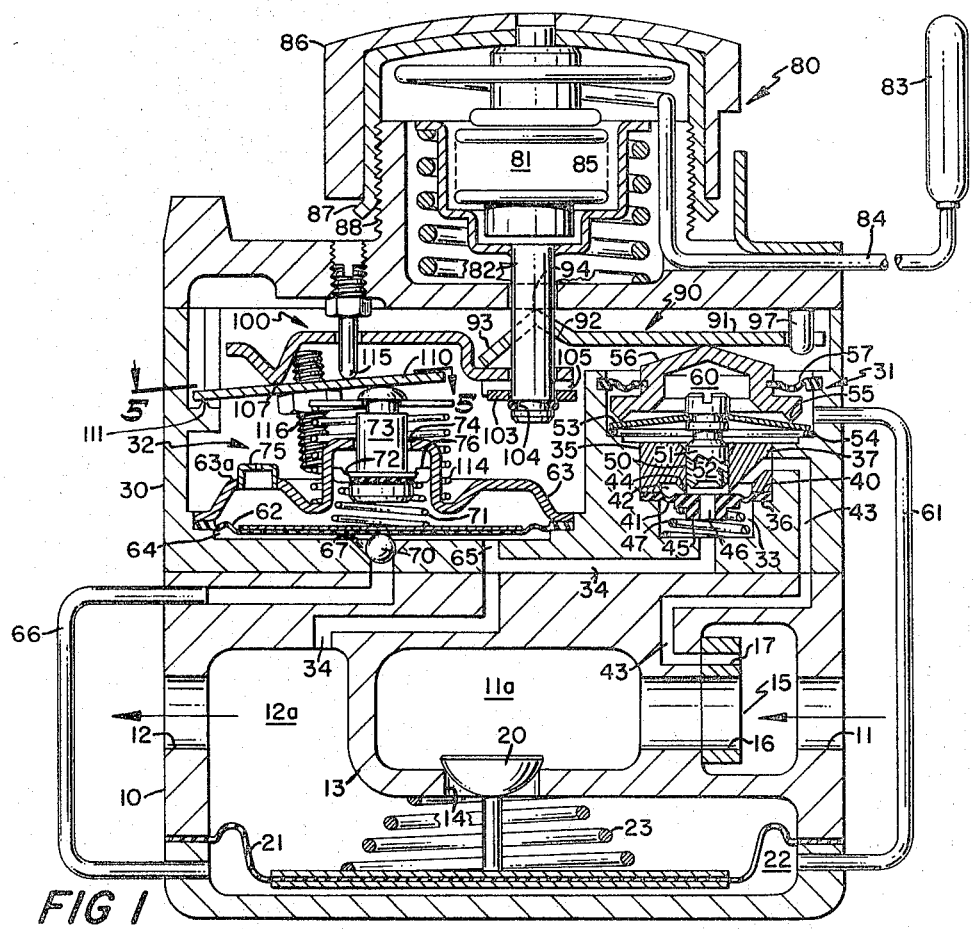
FIG 1
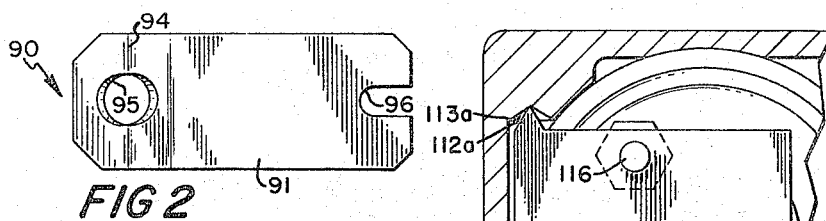
FIG 2
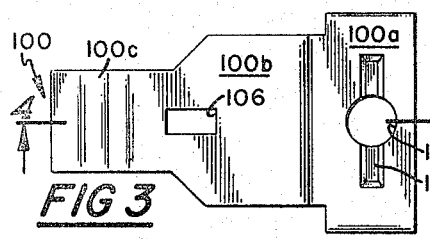
FIG 3
FIG 4
FIG 5
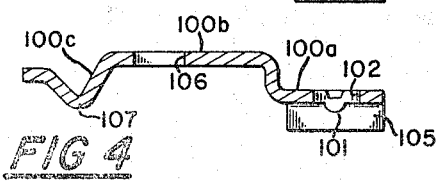
INVENTOR.
COURTLYN B. CURRIE
BY
ATTORNEY

United States Patent Office 3,307,785
Patented Mar. 7, 1967

3,307,785
ON-OFF AND MODULATING CONDITION CONTROL VALVE
Courtlyn B. Currie, Long Beach, Calif., assignor to Honeywell Inc., Minneapolis, Minn., a corporation of Minnesota
Filed July 22, 1965, Ser. No. 474,032
4 Claims. (Cl. 236—80)

This invention relates to control apparatus and more specifically to fluid flow control valves. In particular, it relates to a servo-type pressure regulator valve wherein a single condition responsive actuating means controls on-off operation of the valve and in addition causes modulation of the valve in accordance with variations in the condition to which the device is responsive.

In many applications it is desired to supply fuel to a burner at a rate dependent upon variations in a condition such as temperature and many schemes have been devised for modulating a valve in response to such variations. In addition, it is generally desirable that pressure regulation be provided so that the pressure, at any particular flow rate, be maintained substantially constant. Pressure regulators themselves are well known in the art. This invention combines, by the use of relatively simple and extremely reliable structure, the functions of an on-off valve, a temperature or other condition modulated valve, and a pressure regulator valve. This is accomplished by the use of a servo-type or pilot operated main valve which is controlled by an on-off valve and a variable loaded, outlet pressure responsive, modulating valve. A condition responsive device, such as a temperature responsive actuator is operably connected to the on-off valve and the modulating valve by a linkage arrangement which operates to cause the on-off valve to occupy a position wherein the main valve is closed and to load the modulating valve so that it is responsive to a minimum outlet pressure, whenever the temperature being sensed exceeds a predetermined temperature. When the temperature drops below this predetermined temperature, the linkage is affected to initially operate the on-off valve to a position so that it causes the main valve to open but without substantially effecting the loading on the modulating valve. This causes the main valve to open and to regulate outlet pressure at a minimum flow level. Upon a further decrease in the temperature sensed, the linkage maintains the two-position valve in the same position so that the main valve remains open, and varies the loading on the modulating valve to increase the pressure to which this modulating valve responds and thereby increases the outlet pressure of the main valve.

My invention lies not in the broad concept of a servo-type pressure regulating valve, but rather in the combination therewith of the unique condition responsive pilot valve arrangement discussed above. While reference has been made above and will be made in the following description of a preferred embodiment of the invention to a temperature responsive device, it is to be understood that an actuator responsive to any desired condition may be used.

Various objects and advantages of my invention will become apparent upon reading the following detailed description of a preferred embodiment of the invention wherein reference is made to the drawing in which:

FIGURE 1 discloses somewhat schematically a temperature modulated servo-type pressure regulating valve constructed according to my invention.

FIGURE 2 is a plan view of a member which forms part of a linkage mechanism utilized in my invention.

FIGURE 3 is a plan view of another linkage member which forms a part of the invention; and FIGURE 4 is a cross-sectional view of the last mentioned linkage member, taken generally along line 4—4 in FIGURE 3.

FIGURE 5 is a fragmentary cross-sectional view taken generally along line 5—5 of FIGURE 1 and specifically showing another portion of the linkage mechanism of my invention.

Referring first to FIGURE 1, the valve includes a main body portion 10 having an inlet 11 at the right and an outlet 12 at the left. The inlet and outlet are separated by a wall 13 having an aperture 14 therethrough. Wall 13 divides the main valve body into an inlet chamber 11a and an outlet chamber 12a. Disposed in inlet chamber 11a is a manual control valve 15 which may be, for example, a plug valve or a disk valve with an appropriate manual operator (not shown). Valve 15 controls the flow of fluid through the inlet chamber by means of a port 16 and also controls the flow of pilot gas for purposes which will be described hereinafter by means of a port 17.

Cooperating with aperture 14 in wall 13 is a main valve closure member 20 which is connected to an operating diaphragm 21 which has one side exposed to outlet chamber 12a and the other side exposed to a main pressure or control chamber 22, formed at the lower portion of the valve, as shown in FIGURE 1. A spring 23, disposed between wall 13 and diaphragm 21, urges the diaphragm to a position wherein closure member 20 is seated to prevent fluid flow through aperture 14.

Mounted on top of main body 10 is a servo or pilot valve body 30 which includes a two-position or on-off valve 31 and an outlet pressure responsive modulating valve 32. Referring first to two-position valve 31, it will be seen that body 30 is provided with a stepped cylindrical opening including, at its innermost end, a chamber 33 which is connected to outlet chamber 12a by a passage 34. Outwardly from chamber 33, is an opening 35 which has an annular ledge 36 adjacent chamber 33. Pressed into opening 35, in fluid-tight engagement with the walls therearound, is a cylindrical member 37. At its lower end, member 37 has an outer annular clamping flange 40 which co-acts with the ledge 36 to clamp the periphery in a diaphragm 41, to provide a fluid-tight seal between chamber 33 and opening 35. Inwardly from flange 40, member 37 has an annular chamber 42 which is connected to inlet chamber 11a through a passage 43 and port 17 of manual valve 15. Inwardly from annular chamber 42 is an annular knife edge surface 44 which acts as a valve seat for an annular valve closure member 45 which forms an integral center part of the diaphragm 41. At its center, closure member 45 has an opening 46 extending therethrough. A spring 47 urges closure member 45 into engagement with the annular valve seat 44. Disposed loosely in an aperture 50, which extends centrally through member 37, as a cylindrical closure member 51 which has at its lower end an annular knife edge 52, which is adapted to engage the upper surface of closure member 45 intermediate opening 46 and the point where closure member 45 engages annular knife edge 44. Closure member 45 is affixed, at its upper end, to an over-center snap disk 53 which has its outer edge lying upon a toroidal member 54 which acts as a pivot for the snap disk. Engaging the upper surface of snap disk 53, at a point radially inward from the point of engagement of the snap disk with toroidal member 54, is an annular knife edge 55 formed on the under surface of a member 56 which is sealed with respect to the body 30 by appropriate means, such as a diaphragm 57.

Snap disk 53 normally maintains valve closure member 51 in its upward position so that it is moved away from the upper surface of closure member 45 which, it will be remembered, is normally urged into engagement with knife edge 44 by spring 47. Thus, the area under member 56 and diaphragm 57 and surrounding valve closure member 51 defines another chamber 60 which is normally connected to chamber 33 by opening 46 in valve closure member 45. This chamber 60 is connected to the main control or pressure chamber 22 by a passage 61.

Modulating valve 32 includes an operating diaphragm 62 which is clamped between the housing and an inverted cup-shaped member 63 so that it has one side exposed to pressure under the cup-shaped member and the other side exposed to an actuating chamber 64 which is connected to passage 34 by a passage 65. It will be recalled that passage 34 is connected to outlet chamber 12a of the main valve. Chamber 64 is also connected to control chamber 22 of the main valve by a passage 66 and, at the point where this passage joins chamber 64, there is formed a valve seat 67. Cooperating with the valve seat 67, is a spherical valve closure member 70 which is normally engaged by the underside of diaphragm 62. Diaphragm 62 is urged in a direction to close the closure member 70 by a spring 71, the free end of which engages a flange 72 on a loading member 73. Loading member 73 extends upward through an opening 74 in the inverted cup-shaped member 63 and the surfaces surrounding opening 74 act as a guide for loading member 73. The interior of member 63, and hence the area above diaphragm 62, is connected to the interior of body 30, which is open to atmosphere, by an orifice 75 in member 63. Loading member 73 has associated with it a rubber washer 76 which seals the chamber between diaphragm 62 and member 63 from the interior of body 30 by providing a plunger-type action against the sides of the inverted cup-shaped member 63 surrounding loading member 73.

Mounted on body 30, is a thermal actuator generally designated by the numeral 80. This actuator includes a bellows 81 having an output member 82 which extends into the interior of body 30. The bellows is filled with an expansible material and is connected to an appropriate sensor 83, located at some remote point, by a capillary tube 84. Bellows 81 is generally urged to a retracted position by a spring 85 and the normal or satisfied position of the output member 82 may be selected by manual manipulation of a knob 86 which is connected to an appropriate adjustment device such as a member 87 which is threaded unto an upstanding portion 88 of body member 30.

Inside of body member 30 there is provided a linkage or lever arrangement which operably connects output member 82 of the thermal actuator to both the snap disk for two-position valve 31 and to loading member 73 of modulating valve 32. This linkage includes a first link or lever 90 (see also FIGURE 2) which extends generally horizontally above two-position valve 31. Link 90 is a generally elongated, rectangular member with a generally flat main portion 91, an upwardly bent portion 92 forming an obtuse angle with main portion 91, and a downwardly struck portion or leg 93 extending at an obtuse angle with portion 92. Portions 92 and 93 intersect at an apex or ridge 94 which acts as a fulcrum or pivot line on the underside of the top wall of body 30. An aperture 95 is formed through member 90 with the center of this aperture on line 94 and generally midway between the two sides of the member. Output shaft 82 of thermostatic actuator 80 extends through this opening so link 90 is in fact pivoted on both sides of the output shaft 82. At the opposite end, link 90 is formed with a slot 96 which accepts a downwardly extending guide member 97, which extends from body 30. Intermedate pivot 94 and slot 96, link 90 engages the upper surface of member 56 which, in turn, is operably connected to snap disk 53. It will be apparent from FIGURE 1 that rotation of link 90 about pivot 94 will be effective to move member 56 and, through this member, to operate snap disk 53 and valve 31.

A second link 100 is disposed generally parallel to and partially beneath link 90. At one end, link 100 is formed with a downwardly struck pivotal surface 101 at the center of which is formed a circular aperture 102 through which output shaft 82 extends. Pivot 101 extends downwardly from link 100 and engages the upper surface of an abutment washer 103 which is secured to the lower end of output member 82 by appropriate means such as a snap ring 104. It will be noted that pivot 101 extends generally transversely to the major axis of link member 100 and, at each side of member 100, transverse to pivot 101, is a downwardly extending guide tab 105 one of which extends on either side of abutment washer 104. Pivot 101 and aperture 102 are formed in what may be considered the lefthand extreme portion of link 100. This portion will be designated as portion 100a. An intermediate portion 100b extends generally parallel to portion 100a but displaced upwardly therefrom a short distance. Portion 100b has an aperture 106 formed therethrough through which a stop member 115, to be discussed hereinafter, extends. To the left (as seen in FIGURES 1, 3 and 4) of section 100b is a downwardly struck portion 100c which has an elbow 107 which provides an additional pivot surface. As seen in FIGURE 1, the end of portion 93 of link 90 pivots on the upper surface of portion 100a of link 100 between pivot surface 101 and pivot surface 107 of link 100.

A third link 110 has one end pivoted on a pivot surface 111 formed in body 30. Link 110 is a generally flat, rectangular member which has adjacent one end a pair of laterally extending ears or tabs 112a and 112b which are disposed in a pair of vertically extending slots 113a and 113b formed in body 30. Entrapment of tabs 112a and 112b in these slots restrains longitudinal movement of link 110 but permits it to pivot about surface 111. Adjacent its other end, link 110 engages the upper end of loading member 73 for modulating valve 32. Intermediate these two ends, the upper surface of link 110 is engaged by elbow 107 of link 100 and this provides an additional pivot point between these two members. A spring 114 acts between the upper surface of cup-shaped member 63 and loading member 73 and urges loading member 73 upward. It thereby urges link 110 in a counterclockwise direction and into abutment with an adjustable stop 115 which is threaded into body 30. Stop 115 determines the limit of counterclockwise rotation of link 110 about pivot 111 and consequently defines a minimum loading condition upon diaphragm 62 of modulating valve 32. Threaded through an aperture in link 110 is a further adjustment screw 116. Adjustment screw 116 extends above an annular surface 63a of member 63 and consequently, as link 110 is pivoted in a clockwise direction, the low end of adjustment screw 116 eventually abuts surface 63a. It will thus be apparent that by adjusting the position of the end of adjustment screw 116, it is possible to select the maximum clockwise position of link 110 and consequently the maximum loading condition of diaphragm 62 of modulating valve 32.

Further details of the linkage between thermostatic actuator 80 and valves 31 and 32 can best be obtained from an understanding of the operation of the device. FIGURE 1 discloses the valve in a condition wherein the thermostatic actuator is "satisfied." In other words, sensor 83 is exposed to a temperature such that output member 82 is disposed in a position so that two-position valve 31 connects chambers 60 and 33 thereby connecting pressure chamber 22 of the main valve to outlet chamber 12a and the modulating valve 32 is in its minimum loading position. Since the pressures on opposite sides of diaphragm 21 are equal, spring 23 urges the diaphragm towards chamber 22 and thus closes main valve closure member 20.

Should the temperature decrease at sensor 83, bellows 81 will begin to contract and thus move output member 82 in an upward direction (as seen in FIGURE 1). This will begin to lift the righthand end of link 100. Spring 114 and snap disk 53 are so chosen that upon this initial movement of member 82, link 110 is not permitted to pivot in a clockwise direction but rather remains substantially stationary, thereby maintaining the lefthand end of link 100 stationary. Thus, upon this initial movement of the output member 82, link 100 is pivoted about elbow 107 and lifts the end of leg 93 of link 90 causing link 90 to pivot about its pivot 94. As link 90 is pivoted in a clockwise direction, it forces member 56 downwardly and, after output member 82 has moved a sufficient distance so that sufficient force is applied to snap disk 53 to snap it over-center, valve closure member 51 is moved downward so that annular knife edge 52 engages the upper surface of closure member 45 and moves it downward away from annular knife edge 44. This closes off the previous connection between chambers 33 and 60 and now chambers 42 and 60 are connected through the loose fit between member 51 and aperture 50 so that pressure chamber 22 of the main valve is connected to inlet chamber 11a by means of passage 61, chamber 60, chamber 42 and passage 43. Thus if manual valve 15 is in the open position disclosed in FIGURE 1, inlet pressure will be supplied to pressure chamber 22 and will very quickly move main valve closure member 20 to an open position. Almost immediately the pressure in chamber 12a will be increased due to the flow of fuel through aperture 14 and this pressure will be applied to chamber 64 and the underside of operating diaphragm 62 of modulating valve 32.

As previously noted, link 110 is in its maximum counterclockwise position diaphragm 62 in a minimum loading condition. This loading will be sufficient so that diaphragm 62 responds to an outlet pressure which is sufficient for safe and efficient ignition at the burner and as soon as this particular pressure is reached, diaphragm 62 will be moved upward by the pressure in chamber 64 and hence allow valve 72 to open to connect chamber 22 to outlet chamber 12a through passage 66, chamber 64, and passages 65 and 34. Thus, upon initial opening of two-position valve 31, the main valve will be operated so as to maintain a substantially uniform outlet pressure at a minimum flow condition. Should the temperature sensed by bulb 83 drop further, output member 82 will be moved upward still further. Now that snap disk 53 is snapped over-center it offers a substantial resistance to further movement of member 56 so that link 90 can no longer be rotated in a clockwise direction when output member 82 moves upward. Thus, the end of leg 93 of link 90 now acts as a fixed pivot for link 100 and, as output member 82 moves upwardly, it causes link 100 to pivot in a counterclockwise direction about the end of leg 93 and this motion is transmitted to link 110 through pivot 107. This causes link 110 to be moved in a clockwise direction and to push loading member 73 downwardly to additionally load diaphragm 62. This causes diaphragm 62 to respond only to an increased outlet pressure and consequently causes the main valve to be positioned so as to maintain a substantially uniform outlet pressure at a higher flow rate.

Whenever the temperature sensed by bulb 83 increases so that bellows 81 expands and moves output member 82 downwardly the operation will simply be reversed from that discussed above. The loading on modulating valve 32 will be removed until it reaches its minimum loading position determined by the abutment of link 110 with stop 115 and thereafter, further movement of output member 82 will result in snapping snap disk 53 over-center to move modulating valve 31 to its initial position. In this position chambers 33 and 60 are again connected while chamber 42 is closed off. This connects pressure chamber 22 of the main valve to outlet chamber 12a and main valve closure member 20 is closed.

From the foregoing it can be seen that I have provided a relatively simple and compact valve which combines on-off control, temperature modulation and pressure regulation. I have described the preferred embodiment of the invention and it is to be understood that this is by way of example only. Since various modifications may become apparent to those skilled in the art in view of my disclosure herein, it is to be understood that the invention is to be limited solely by the scope of the appended claims.

I claim:

1. A control valve comprising: a body having an inlet, an outlet, an apertured wall therebetween, a main valve closure member cooperable with the aperture in said wall and a pressure chamber including a movable wall operably connected to said main closure member so that the position of said closure member relative to said aperture is controlled by the pressure in said chamber and so that an increased pressure in said chamber tends to open said aperture; a two-position control valve; first passage means connecting said control valve to said inlet, said outlet and said pressure chamber so that in a first of its positions said control valve connects said pressure chamber to said inlet and, in the second of its positions, said control valve connects said chamber to said outlet; second passage means connecting said chamber to said outlet; modulating valve means in said second passage means and including pressure responsive operating means operable by pressure at said outlet to position said modulating valve means to control the pressure in said chamber to maintain a substantially uniform pressure at said outlet; loading means operably associated with said operating means and variable between minimum and maximum loading conditions to vary the pressure at which said operating means operates; a thermostatic operator including temperature sensing means and an output member movable in response to temperature variations; a snap disk operably connected to said two-position valve and normally maintaining said two-position valve in its second position; yieldable means normally maintaining said loading means in its minimum position; a first lever pivoted intermediate its ends on said housing and having one end operably connected to said snap disk; a second lever pivotally connected intermediate its ends to the other end of said first lever and operably connected at one of its ends to said output member; a third lever pivotally connected intermediate its ends to the other end of said second lever and having one end pivoted on said body and the other end operably connected to said loading means, the resilience of said snap disk and of said yieldable means and the effective lengths of said levers being chosen so that upon initial movement of said output member in one direction said third lever remains substantially stationary and said second lever pivots with respect thereto and pivots said first lever with respect to said body until said snap disk is snapped over-center and operates said two-position valve to its first position and so that, upon further movement of said output member in the same direction, said first lever remains substantially stationary and said second lever pivots with respect thereto and pivots said third lever to increase the loading on said operator for said modulating valve.

2. A control valve comprising: a body having an inlet, an outlet, an apertured wall therebetween, a main valve closure member cooperable with the aperture in said wall and a pressure chamber including a movable wall operably connected to said main closure member so that the position of said closure member relative to said aperture is controlled by the pressure in said chamber; first passage means connecting said inlet to said pressure chamber; a two-position control valve in said first passage; second passage means connecting said chamber to said outlet; modulating valve means in said second passage means and including pressure responsive operating means operable by pressure at said outlet to position said modulating valve means to control the pressure in said chamber to maintain a substantially uniform pressure at said outlet; loading means operably associated with said operating means and variable between minimum and maximum loading conditions to vary the pressure at which said operating means operates; a condition responsive operator including sensing means and an output member movable in response to variations in the condition being sensed; snap-acting means operably connected to said two-position valve in a first of its positions to cause the main closure member to be closed by said movable wall; yieldable means normally maintaining said loading means in a first of its positions; a first lever pivoted on said housing and having one end operably connected to said snap-acting means; a second lever pivotally connected to the other end of said first lever and operably connected at one of its ends to said output member; a third lever pivotally connected to the other end of said second lever and having one end pivoted on said body and the other end operably connected to said loading means, the resilience of said snap-acting means and of said yieldable means and the effective lengths of said levers being chosen so that upon initial movement of said output member in one direction said third lever remains substantially stationary and said second lever pivots with respect thereto and pivots said first lever with respect to said body until said snap-acting means is snapped over-center and operates said two-position valve to its second position to cause said main closure member to open to a minimum flow position and so that, upon further movement of said output member in the same direction, said first lever remains substantially stationary and said second lever pivots with respect thereto and pivots said third lever to vary the loading on said operator for said modulating valve so that said operator operates only in response to an increased pressure at said outlet so that the outlet pressure is maintained at a pressure greater than that at minimum flow.

3. A control valve comprising: a body having an inlet, an outlet, an apertured wall therebetween, a main valve closure member cooperable with the aperture in said wall and a pressure chamber including a movable wall operably connected to said main closure member so that the position of said closure member relative to said aperture is controlled by the pressure in said chamber and so that an increased pressure in said chamber tends to open said aperture; a two-position control valve; first passage means connecting said control valve to said inlet and to said pressure chamber so that in its open position said control valve connects said pressure chamber to said inlet; second passage means connecting said chamber to said outlet; modulating valve means in said second passage means and including pressure responsive operating means operable by pressure at said outlet to position said modulating valve means to control the pressure in said chamber to maintain a substantially uniform pressure at said outlet; loading means operably associated with said operating means and variable between minimum and maximum loading conditions to vary the pressure at which said operating means operates; a condition responsive operator including sensing means and an output member movable in response to variations in the condition being sensed; over-center snap means operably connected to said two-position valve and normally maintaining said two-position valve in its closed position; yieldable means normally maintaining said loading means in its minimum position; a first lever pivoted on said housing and operably connected to said snap means; a second lever pivoted on said body, pivotally connected to said first lever, and operably connected to said output member; a third lever pivotally connected to said second lever and operably connected to said loading means, the resilience of said snap means and of said yieldable means and the effective lengths of said levers being chosen so that upon initial movement of said output member in one direction said third lever remains substantially stationary and said second lever pivots with respect thereto and pivots said first lever with respect to said body until said snap means is snapped over-center and operates said two-position valve to its open position and so that, upon further movement of said output member in the same direction, said first lever remains substantially stationary and said second lever pivots with respect thereto and pivots said third lever to increase the loading on said operator for said modulating valve.

4. A condition responsive pilot valve for controlling the pressure in the operating pressure chamber of a main valve, the pilot valve comprising: a two-position control valve; first passage means adapted to connect said control valve to the inlet, the outlet, and the pressure chamber of the main valve so that in one of its positions said control valve connects the pressure chamber to the inlet and, in the other of its positions, said control valve connects the chamber to the outlet; second passage means adapted to connect the chamber to the outlet of the main valve; modulating valve means in said second passage means and including pressure responsive operating means adapted to be connected so that it is operable by pressure at the outlet of the main valve to position said modulating valve means to control the pressure in the chamber to maintain a substantially uniform pressure at the outlet; loading means operably associated with said operating means and variable between minimum and maximum loading conditions to vary the pressure at which said operating means operates; a condition responsive operator including sensing means and an output member movable in response to variations of the condition being sensed; snap-acting means operably connected to said two-position valve and normally maintaining said two-position valve in one of its positions; yieldable means normally maintaining said loading means in a first of its positions; a first lever pivoted on said housing and having one end operably connected to said snap-acting means; a second lever pivotally connected to the other end of said first lever and operably connected at one of its ends to said output member; a third lever pivotally connected to the other end of said second lever and having one end pivoted on said body and the other end operably connected to said loading means, the resilience of said snap-acting means and of said yieldable means and the effective lengths of said levers being chosen so that upon initial movement of said output member in one direction said third lever remains substantially stationary and said second lever pivots with respect thereto and pivots said first lever with respect to said body until said snap-acting means is snapped over-center and operates said two-position valve to the other of its positions and so that upon further movement of said output member in the same direction, said first lever remains substantially stationary and said second lever pivots with respect thereto and pivots said third lever to vary the loading on said operator for said modulating valve.

References Cited by the Examiner

UNITED STATES PATENTS

| 2,314,266 | 3/1943 | Beam | 236—80 |
| 2,743,870 | 5/1956 | Drow | 236—48 |
| 2,784,913 | 3/1957 | Wasson | 236—92 |
| 2,876,951 | 3/1959 | Matthews | 236—84 |
| 3,235,180 | 2/1966 | Graham et al | 236—80 |

ALDEN D. STEWART, *Primary Examiner.*